United States Patent [19]

Yoshida

[11] 4,439,836
[45] Mar. 27, 1984

[54] ELECTRONIC TRANSLATOR

[75] Inventor: Kunio Yoshida, Nara, Japan

[73] Assignee: Sharp Kabushiki Kaisha, Osaka, Japan

[21] Appl. No.: 199,526

[22] Filed: Oct. 22, 1980

[30] Foreign Application Priority Data

Oct. 24, 1979 [JP] Japan ................. 54-137921

[51] Int. Cl.³ .............................. G06F 15/38
[52] U.S. Cl. ................... 364/900; 364/419
[58] Field of Search ............ 364/419, 709, 715, 8, 364/200 MS File, 900 MS File; 364/523

[56] References Cited

U.S. PATENT DOCUMENTS

| | | | |
|---|---|---|---|
| 3,932,859 | 1/1976 | Kyriakides | 364/900 |
| 3,936,664 | 2/1976 | Sato | 364/523 |
| 4,130,882 | 12/1978 | Swamstrom | 364/900 |
| 4,158,236 | 6/1979 | Levy | 364/900 |
| 4,159,536 | 6/1979 | Kehoe | 364/900 |
| 4,218,760 | 8/1980 | Levy | 364/900 |
| 4,339,806 | 7/1982 | Yoshida | 364/900 |

FOREIGN PATENT DOCUMENTS 1448211  9/1976  United Kingdom ......... 364/900

OTHER PUBLICATIONS

Booth, A. D., *Machine Translation*, N.Y., North-Holland, 1967, p. 308.B6.

*Primary Examiner*—Jerry Smith
*Assistant Examiner*—Michael R. Fleming
*Attorney, Agent, or Firm*—Birch, Stewart, Kolasch & Birch

[57] ABSTRACT

An electronic translator comprises a first memory for memorizing a plurality of words represented in a first language, such words comprising one or more first letters which remain unchanged regardless of inflection, and one or more second letters which may change. An input device is provided for entering a first word. A comparison circuit is provided for comparing parts of the first word and the one or more first letters. Upon the occurrence of the equivalency detected by the comparison circuit, it is detected that the first word is identical to one of the words developed by the first memory. A second memory is provided for memorizing a plurality of translated words, represented in a second language, each corresponding to words stored in the first memory. In another form of the present invention, the first memory is provided for memorizing a plurality of words associated with the first word regardless of whether it is a noninflected word or an inflected word.

8 Claims, 3 Drawing Figures

| Output of Detection CCTS | | | Output of F/F 28 | Output of And Gates | | | | | Operation |
|---|---|---|---|---|---|---|---|---|---|
| 25 | 26 | 27 | | AND 29a | AND 29b | AND 29c | AND 29d | AND 29e | |
| X=· | | | | 0 | 0 | 0 | 0 | 0 | F/F 28 is set. Character Address of Address Counter 22 is renewed. |
| X≠· | X=space | X=Y | | 0 | 1 | 0 | 0 | 0 | Output of Signal F |
| X≠· | | X≠Y | | 0 | 0 | 1 | 0 | 0 | Output of Signal E |
| X≠· | X≠space | X=Y | 1 | 1 | 0 | 0 | 0 | 0 | Character Addresses of Address Counters 22 and 24 are renewed. |
| X≠· | | | 1 | 0 | 0 | 0 | 1 | 0 | Output of Signal E |
| X≠· | | X≠Y | 0 | 0 | 0 | 0 | 0 | 1 | Output of Signal A |

FIG. 3

ELECTRONIC TRANSLATOR

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differs from conventional electronic devices in that the former is of a unique structure which provides for efficient and rapid retrieval of word information stored in a memory. An example of such electronic dictionaries and language interpreter was disclosed in Levy U.S. Pat. No. 4,158,236, June 12, 1979, ELECTRONIC DICTIONARY AND LANGUAGE INTERPRETER.

These conventional portable language interpreter function so that a noninflected word, not an inflected word, was entered to obtain a translated word equivalent to it. It was usual that the inflected word was not contained within a memory of the interpreter. Even if the inflected word and its relationship to the noninflected word was stored in the memory, it was difficult to quickly obtain a translation of the noninflected word. It was frequent that the inflected word may have another translated word which did not correspond to the noninflected word. Therefore, it could not find that the inflected word corresponded to a particular noninflected form.

It is desired that the portable language interpreters generate a translated word equivalent to the inflected word in response to the introduction of the noninflected word.

SUMMARY OF THE INVENTION

Accordingly, it is an object of the present invention to provide an improved language interpreter for outputting a noninflected form corresponding to an inflected word, and a translated word equivalent to the noninflected form, in response to the introduction of the inflected word.

It is another object of the present invention to provide an improved electronic translator enabling rapid retrieval of a word stored therein.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic translator comprises a first memory for memorizing a plurality of words represented in a first language, formed by one or more first letters which remain unchanged regardless of inflection, and one or more second letters which are inflected. An input device is provided for entering a first word. A comparison circuit is provided for comparing parts of the first word and the one or more first letters. Upon the occurrence of the equivalency detected by the comparison circuit, it is detected that the first word is identical to one of the words developed by the first memory. A second memory is provided for memorizing a plurality of translated words, represented in a second language, each corresponding to words stored in the first memory.

In another form of the present invention, the first memory is provided for memorizing a plurality of words available in association with the first word regardless of whether it is a noninflected word or an inflected word.

BRIEF DESCRIPTION OF THE DRAWINGS

The present invention will be better understood from the detailed description given hereinbelow and the accompanying drawings which are given by way of illustration only, and thus are not limiting of the present invention and wherein:

FIG. 3 shows a table representing operation of the circuit element as shown in FIG. 2.

DESCRIPTION OF THE INVENTION

First of all, any kind of language can be applied to an electronic translator of the present invention. An input word is spelled in a specific language to obtain an equivalent word, or a translated word spelled in a different language corresponding thereto. The kind of the languages can be freely selected. According to an example of the present invention, it is assumed that the input language is English and the translated language is Japanese. Tables 1 and 2, as described below, show pairs including a noninflected word and an inflected word which are stored in a memory of the electronic translator as entry words.

TABLE I

| | English | |
|---|---|---|
| | (a) | (b) |
| singular | strawberry | strawberry |
| plural | strawberries | |
| singular | book | book |
| plural | books | |
| singular | child | child |
| plural | children | |

TABLE 2

| | German | |
|---|---|---|
| (a) | | (b) |
| auge | | |
| auges | | auge |
| augen | | |
| kind | | |
| kinds | | kind |
| kindes | | |
| kinder | | |
| kindern | | |
| lieben | | lieben |
| liebe | | |
| liebst | | |
| liebt | | |

Items (b) of Tables 1 and 2 show a format by which the words are stored in the memory of the electronic translator while items (a) of Tables 1 and 2 show pairs of a noninflected word, singular in Table 1 and an inflected word, plural in Table 1.

In accordance with the principle of the present invention, as viewed from items (b) of Tables 1 and 2, each of the formats comprises an unchanged form, for example, "strawberr" with respect to the words "strawberry" and "stawberries", a changeable form, "y" with these words, and a separation mark "." marked to divide the above two forms.

With respect to the pair of exemplary words "book" and "books" in Table 1 in which the word "books" is formed by the addition of one or more letters, for example "s" to the word "book", the format to be stored in the memory of the electronic translator is set to be the unchanged form "book". This is similar with respect to the pair of exemplary words "child" and "children" in Table 1.

By virtue of the above described principle, the number of words to be memorized in the memory is advantageously simplified. More particularly, the number of the words is 44 if all the words as listed item (a) of Table 1 are stored in the memory as such. On the contrary, the above described principle makes it sufficient for the memory to memorize all the words as listed in item (b) of Table 1 in which the number of the words is 22 containing the words "stawberr.y", "book", and "child".

Figure 1:
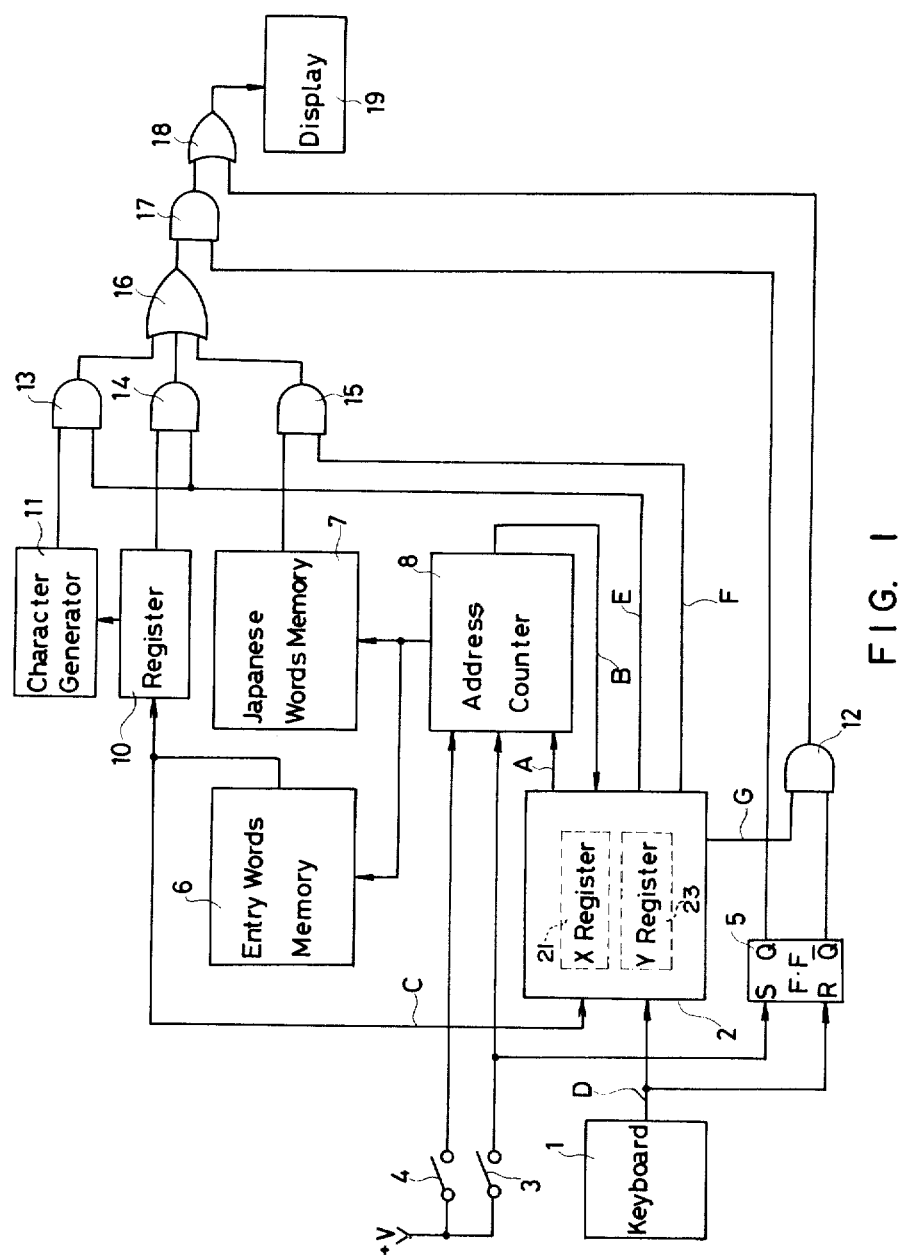
FIG. 1 shows a block diagram of a circuit implemented within an electronic translator according to the present invention.

Referring now to FIG. 1, there is illustrated a circuit implemented within the electronic translator of the present invention.

The circuit comprises a keyboard 1, a recognition circuit 2, two switches 3 and 4, a flip flops 5, an entry words memory 6, a Japanese words memory 7, an address counter 8, a register 10, a character generator 11, an "X" register 21, an "Y" register 23, AND gates 12 through 15 and 17, OR gates 16 and 18, and a display 19.

More particularly, the keyboard 1 is actuated to enter a desired English word or words. Preferably, the keyboard 1 contains a full number of English alphabetical key switches and other necessary functional key switches such as capital and small letters. If it is desired to translated Japanese word or words, the keyboard 1 should be replaced by another type of keyboard for entering words in Japanese or a keyboard including a full number of Japanese alphabetical key switches.

The English word entered is applied to the recognition circuit 2 for comparing the English word entered and one of the words generated by the entry words memory 6 in order to recognize a noninflected word corresponding to the entered English word which may be an inflected word.

The memory 6 contains a plurality of words, as listed in item (b) of Table 1. The Japanese words memory 7 contains a plurality of Japanese words each equivalent to words stored in the memory 6. The Japanese words are set so that each of them is developed in association with each of the entry words.

Either of the switches 3 and 4 is actuated to advance the contents of the address counter 8 by one. The address counter 8 is connected to address the memories 6 and 7. One of the words developed by the memory 6 is introduced to the register 10 and the recognition circuit 2. The register 10 is used to memorize the format, as listed in item (b) of Table 1, except for the separation mark ". ". The output of the register 10 is applied to the AND gate 14.

The character generator 11 is provided for generating an additional mark representing an inquiry whether a word presently entered is correctly recognized by the electronic translator or not. An example of such an additional mark is "?". This mark is entered to the AND gate 13. Each of the AND gates 13 and 14 is made conductive by E signals applied by the recognition circuit 2. One Japanese word developed by the memory 7 is applied to the AND gate 15. The AND gate 15 is made conductive by F signals developed by the recognition circuit 2.

Each of outputs of the AND gates 13 through 15 is introduced to the AND gate 17 through the OR gate 16. The AND gate 17 is made conductive by Q signals generated by the flip flop 5. The flip flop 5 is turned set in response to the activation of the switch 3. The output of the AND gate 17 is admitted to the display 19 through the OR gate 18. The flip flop 5 is reset in response to the operation of the keyboard 1. $\overline{Q}$ signals provided by the flip flop 5 are used to make the AND gate 12 conductive. The AND gate 12 is provided to enable the English word provided by the keyboard 1 and applied to the recognition circuit to be displayed in the display 19. The output of the AND gate 12 is entered to the display 19 through the OR gate 18.

Figure 2:
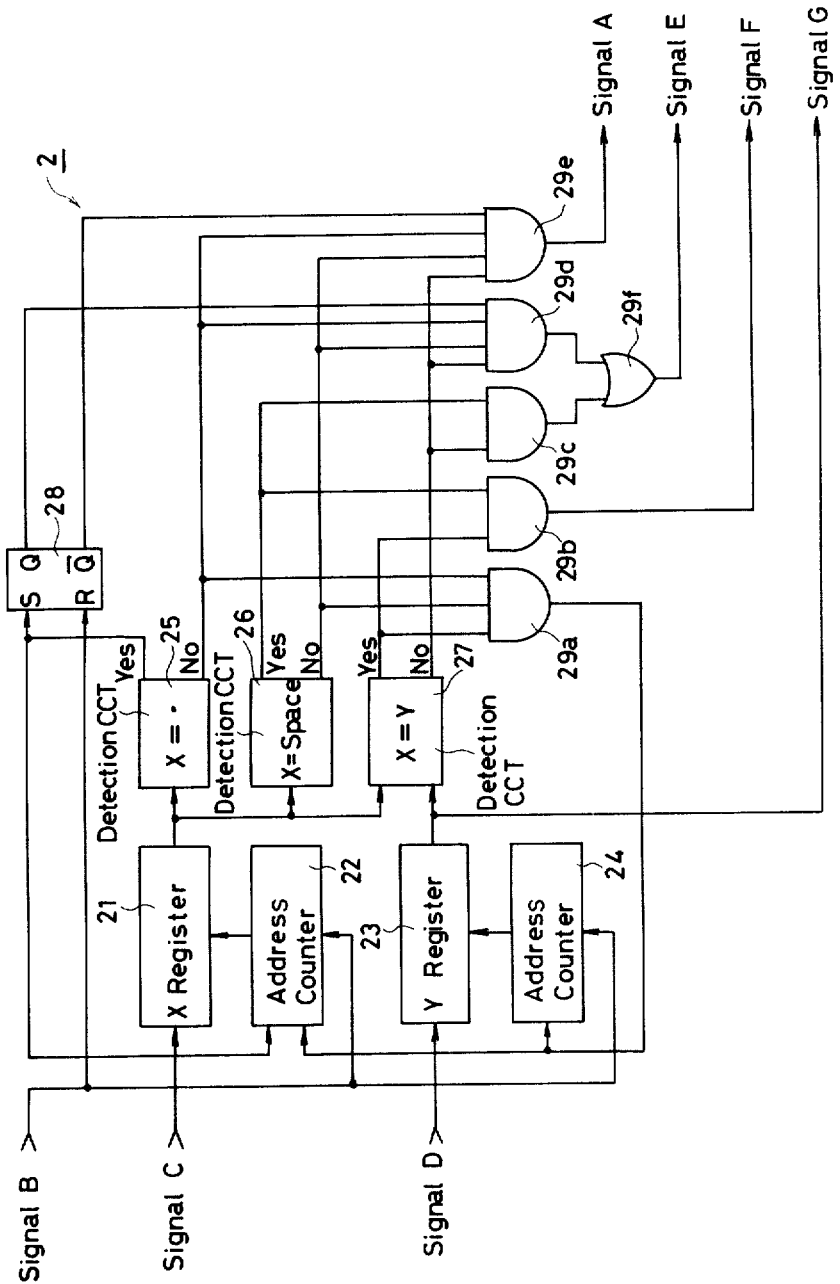
FIG. 2 shows a block diagram of a circuit element connected in the circuit of FIG. 1.

FIG. 2 shows a more detailed block diagram of the recognition circuit 2. The circuit 2 comprises the X register 21, two address counters 22 and 24 the Y register 23, three detection circuits 25 through 27, a flip flop 28, five AND gates 29a through 29e, and an OR gate 29f.

The X register 21 is provided for storing one of the entry words developed by the memory 6. The Y register 23 is provided for storing the English word entered by the keyboard 1. Letters of the English word stored in the X register 21 are subsequently outputted in such a manner that the letter or the letters is firstly developed and the following letters are subsequently developed, according to address signals applied by the address counter 22. They are introduced each of the three detection circuits 25 through 27.

The detection circuit 25 is provided for detecting the above described separation mark ".". The detection circuit 26 is provided for detecting end signals, namely, space attached to each of the English words provided by the memory 6.

The detection circuit 27 is provided to compare the English word stored in the Y register 23 and the English word stored in the X register 21 which is developed by the memory 6. The English word stored in the Y register, which is entered by the keyboard 1, is subsequently applied to the detection circuit 27 according to address signals developed by the address counter 24, in such a manner that the head letter of the English word is firstly developed and the following letters are then developed.

Upon the detection of the separation mark ".", the detection circuit 25 sets the flip flop 28 advances and the address counter 22 by one. The end signals, namely, space is detected by the detection circuit 26. Each of the end signals is attached to each of the ends of the English words supplied the X register 21.

The AND gate 29a makes the address counters 22 and 24 advance by one under the condition that each of the detection circuits 25 and 26 provide NO signals representing that the mark is not detected, and the detection circuit 27 detects the coincidence between the English words to provide the YES signal. The AND gate 29b provides F signals under the condition that the detection circuit 26 detects the end signals (space) to provide the YES signals, and the detection circuit 27 detects the coincidence between the English words to provide the YES signals.

The AND gate 29c supplies E signals through the OR gate 29f under the condition that the detection circuit 26 detects the end signals (space) to provide the YES signals, and the detection circuit 27 provides the NO signal representing that the English words are not equivalent. The AND gate 29d generates E signals through the OR gate 29f under the condition that the flip flop 28 is made set and each of the detection circuits 25 through 27 provides the NO signals.

The AND gate 29e generates A signals under the condition that the flip flop 28 is made reset and each of the detection circuits 25 through 27 provides the NO signals. The flip flop 28 and each of the address counters 22 and 24 are turned reset by the B signals supplied by the address counter 8 of FIG. 1.

FIG. 3 shows a table representing operation of each of the detection circuits 25 through 27 and the AND gates 29a through 29e.

Referring now to FIGS. 1 through 3, a preferred embodiment of the present invention will be described as follows.

It is supposed that the memory 6 does not store the following words at all:

s. ~ (~: arbitrary letter or letters)
st. ~
str. ~
~ strawber. ~
s
st
str
~ strawberr
b. ~
bo. ~
boo. ~
b
bo
boo Further, it is supposed in this embodiment that the distinction between capital letters and small letters, according to either of which the English words are to be entered to the electronic translator, is left out of consideration, and all the English words are entered in the form of the small letters and all the English words stored in the memory 6 are also in the form of the small letters.

When the keyboard 1 is actuated to enter a particular word, say "book", the word is introduced into the Y register 23 of the recognition circuit 2 and the flip flop 5 is turned reset. The AND gate 12 becomes conductive so that the word stored in the Y register 23 is entered to the display 19 for display purposes, through the AND gate 12 and the OR gate 18.

The switch 3 is closed to commence the translation from English to Japanese. The address counter 8 is operated so that the memory 6 provides one English word. In addition, the address counter 8 enables the memory 7 to provide one Japanese word corresponding to the English word developed by the memory 6.

From the above described assumption, the memory 6 does not provide any word such as "bo" and "boo". Therefore, until the separation mark or the space is detected by each of the detection circuits 25 and 26, it is impossible for each of the detection circuits 25 through 27 to provide any of the YES signals, and the flip flop 28 continues to provide the $\overline{Q}$ signals.

As a result, as long as the memory 6 does not provide the English word "book", AND gate 29e continues to provide the A signals. For example, it is assumed for the memory 6 to provide a word "boy", each of the address counters 22 and 24 enables the generation of each of the head letters "b" of the words stored in each of the X register 21 and the Y register 23.

As shown in FIG. 3, the output of the AND gate 29a is in the logical level "1", so that each of the address counters 22 and 24 enables the output of each of the second letters of the words stored in each of the X register 21 and the Y register 23. Each of the second letters is "o" in this instance. The output of the AND gate 29a is in the logical level "1". Each of the address counters 22 and 24 enables the output of each of the third letters of those words stored in the registers 21 and 23. The X register 21 provides "y" as the third letter while the Y register 23 generates "o" as the same. The detection circuit 27 generates the NO signals representing that they are not equivalent.

The detection circuit 25 can not detect the separation mark to thereby provide the NO signals and the flip flop 28 is made reset, the AND gate 29e provides the A signals in the logical level "1" of high level. Responsive to the delivery of the A signals in this level, the address counter 8 enables the memory 8 to generate a word following "boy".

The above described operation is repeated until the memory 6 generates the word "book". When the word "book" is generated from the memory 6, the detection circuit 27 generates the YES signals by comparing the first through the fourth letters, so that the AND gate 29a becomes conductive. Each of the address counters 22 and 24 is advanced by one to enable the generation of the following, fifth letter from each of the X register 21 and the Y register 23. In this instance, each of the X register 21 and the Y register 23 generates the space between words, as the fifth letter. The detection circuit 26 senses the presence of the space and the detection circuit 27 generates the YES signals. Accordingly, the AND gate 29b develops the F signals. Upon the generation of the F signals from the AND gate 29b, the memory 7 develops a Japanese word corresponding to the English word "book". The Japanese word is introduced into the display 19 for display purpose through the AND gate 15, the OR gate 16, the AND gate 17, and, eventually, the OR gate 18. While the above described search operation is performed, the display 19 indicates the word "book" upon the input of this word by the keyboard 1, and indicates the corresponding Japanese word upon the close of the switch 3.

It is now assumed that in place of the word "book", another word "books" is entered by the keyboard 1. The above described search operation is similar in this case as in case of the word "book" with respect to the first through the fourth letters. The following operation is different.

Each of the address counters 22 and 24 enables the generation of each of the fifth letters from the X register 21 and the Y register 23. The X register 21 develops the space while the Y register 23 develops a letter "s". Therefore, the AND gate 29c provides the E signals in the logical level "1" which are conducted by the OR gate 29f. Responsive to the output of the E signals, each of the AND gates 13 and 14 becomes conductive. The question mark "?" supplied by the character generator 11 is added to the word "book" contained in the register 10 so that the results are shown in the display 19.

In summary, the word "books" is entered by the keyboard 1 so that the display 19 displays "books". Upon the close of the switch 3, the display 19 is adapted to display "book ?", meaning that the operator is asked by the electronic translator whether it is all right or sufficient to conduct the translation of "book" in palce of the translation of "books". Needless to say, it is incorrect grammar to translate "books" as such. But, this kind of modification would be all right in the case where a noninflected word related to the inflected word, say, "books" is to be searched or it is otherwise sufficient to obtain a "loose" translation of this word.

If it is desired to obtain a Japanese word corresponding to the noninflected word "book" it is possible by the control that the display 19 indicates the output of the memory 7 since the address counter 8 contains the address signals used to develop the word "book" from the memory 6.

When a still another word "bookstore" is entered by the keyboard 1 in the case where the memory 6 stores "book" followed by "bookstore", the indication "book ?" is enabled according to the above described manner.

To eliminate the problem of the occurrence of "book ?" in response to the input of "bookstore", it will be useful to modify the order of the entry words as stored in the memory 6. Alternatively, the following system will be useful: The address signals of the address counter 8 continue to be renewed until the F signals are developed. When they are developed and detected, the corresponding Japanese word is displayed. If they are not developed in spite of addressing all the words stored in the memory 6, the address counter 8 is operated to renew the address signals from the beginning, again in order to detect the E signals.

When a further word "strawberries" is entered by the keyboard 1, the memory 6 is operated to generate "strawberr.y" in the above described manner. The detection circuit 27 is operated to detect the first letter through the ninth letter as each of them is equivalent. Each address counter 22 and 24 is operated to specify the tenth letter.

The X register 21 develops the separation mark. The detection circuit 25 detects the mark to thereby make the flip flop 28 set and the address counter 22 advance by one. The X register 21 develops the last letter "y" while the Y register 23 develops the letter "i". The subsequent operation is similar as in the case of "books".

In place of "strawberries", "strawberry" is entered whereby the X register 21 develops "y" while the Y register 23 develops "y".

The detection circuit 27 develops the YES signals because of the occurrence of equivalency. The detection circuit 26 detects the space. The AND gate 29b is made conductive to generate the F signals. Responsive to the F signals, the AND gate 15 is made conductive so that the corresponding Japanese word generated from the memory 7 is displayed in the display 19.

As stated above, the memory 6 contains a plurality of pairs of words having one or more unchanged letters and one or more changeable letters. Comparison is carried out between a word entered and one of the words developed by the memory 6, whereby, when the one or more unchanged letters are detected to be equivalent to the word entered, it is detected that the word entered is one of the words developed by the memory 6. Upon the detection, the memory 7 develops the corresponding Japanese word for display purposes.

According to another embodiment of the present invention where translation from Japanese to English is performed, the present invention can be applied to Japanese words the ends of which are inflected.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator device for obtaining a second word represented in a second language equivalent to an input word in a first language, comprising:
   input means for entering the input word;
   first memory means for memorizing a plurality of first words in the first language, each of said first words comprising one or more first letters which remain unchanged regardless of inflection and one or more second letters which change according to inflection;
   address means operatively connected to said input means and responsive to entry of the input word for addressing said first memory means to develop one of the plurality of first words;
   detection means operatively connected to said first memory means and responsive to said address means for detecting eqivalency between the input word and said first letters of respective first words;
   second memory means for memorizing a plurality of second words in the second language corresponding to first words stored in said first memory means;
   first means operatively connected to said detecting means for activating said second memory means whereby said second memory means develops a second word corresponding to the input word when the input word is equivalent to one of said first words; and
   second means operatively connected to said detecting means for indicating that one of said first words in said first memory means comprises a noninflected form of the input word.

2. The device of claim 1, wherein said first memory means further memorizes separation marks interposed between said one or more first letters and corresponding said one or more second letters.

3. The device of claim 1, wherein said first memory means further memorizes a space following each of said first words.

4. The device of claim 1, further comprising display means connected to said second memory means for displaying the second words.

5. The device of claim 2, wherein said detection means contains a first detection circuit for detecting each of the separation marks.

6. The device of claim 3, wherein said detection means contains a second detection circuit for detecting each of the spaces.

7. The device of claim 1, wherein said second memory means memorizes a plurality of second words corresponding to respective said one or more first letters which are unchanged according to inflection.

8. The device of claim 1, wherein said second means comprises a character generator coupled to said first memory means for adding a mark to said one or more first letters whereby said one or more first letters are displayed together with the mark.

* * * * *